United States Patent [19]

Reinten

[11] Patent Number: 4,712,116
[45] Date of Patent: Dec. 8, 1987

[54] MEANS AND METHOD OF SYMMETRICAL ENERGIZATION OF INDIVIDUAL ARRAY LED'S FOR IMAGE EXPOSURE

[75] Inventor: Hans Reinten, Velden, Netherlands

[73] Assignee: Oce-Nederland B.V., Venlo, Netherlands

[21] Appl. No.: 812,175

[22] Filed: Dec. 23, 1985

[30] Foreign Application Priority Data

Dec. 24, 1984 [NL] Netherlands .................. 8403926

[51] Int. Cl.$^4$ .................. G01D 9/42; G01D 9/00; H04N 1/21
[52] U.S. Cl. .................. 346/107 R; 46/107 R; 358/302
[58] Field of Search .................. 346/107 R, 108, 160, 346/1.1; 358/283, 286, 296, 302

[56] References Cited

U.S. PATENT DOCUMENTS

| | | | |
|---|---|---|---|
| 4,571,602 | 2/1986 | De Schamphelaere | 346/108 |
| 4,575,739 | 3/1986 | De Schamphelaere | 346/160 |
| 4,596,995 | 6/1986 | Yamakawa | 358/302 |

*Primary Examiner*—E. A. Goldberg
*Assistant Examiner*—Mark Reinhart
*Attorney, Agent, or Firm*—Reed Smith Shaw & McClay

[57] ABSTRACT

A method and means of exposing a movable light-sensitive layer by means of an array of LED's are disclosed. The invention comprises energizing for each image line and for a variable time each LED in the array symmetrically with respect to an imaginary line extending parallel to the array by using comparator circuits connected to a signal generator for a selected period of time used to generate a uniformly decreasing and increasing signal and to buffers for storing a corrected image signal so that the LED's are energized by the compared signal from an associated comparator circuit.

7 Claims, 4 Drawing Figures

MEANS AND METHOD OF SYMMETRICAL ENERGIZATION OF INDIVIDUAL ARRAY LED'S FOR IMAGE EXPOSURE

FIELD OF THE INVENTION

This invention relates to a means and method of exposing a movable light-sensitive layer by a straight array of LED's, and in particular a method in which a straight array of LED's for line-wise exposure of the light-sensitive layer, is extended perpendicularly to the direction of movement of a light-sensitive layer and means for energizing each individual LED in the array per image line for a variable time corresponding to corrected image signals.

BACKGROUND OF THE INVENTION

Devices and methods for length-wise exposure of photo conductors by a LED array are well known. A number of such devices have been disclosed including a device and method in which each individual LED in an array can be activated for a variable time, U.S. Pat. No. 4,074,320. Also see U.S. Pat. Nos. 3,482,039 and 4,040,094. However, of particular interest is British Application No. GB-A 2104266 which describes a printer in which a straight array of light-emitting diodes (LED's) is used to expose a photo-conductor in image-wise fashion. Since the radiated light intensities of the individual LED's, on energization, are not equal, a circuit is used in which the individual LED's are energized for a different time per image line to be imaged, so that each LED radiates substantially equal energy during an image line to be imaged. The energization time for each LED is thus controlled in inverse proportion to the light intensity of that LED. For this purpose, a 4-bit correction number is stored in a memory which is in inverse proportion to the relative energy delivery of this LED. An image signal is fed to this memory and multiplied by the corresponding 4-bit correction number. The resulting combined signal is then fed to a shift register of the serial-in-parallel-out type. Four outputs of the shift register are always combined, each via a tri-state buffer, and fed to a LED. The four switching inputs of the said buffers are each connected to an output of a signal generator. The signal generator delivers a time pulse per image line to each of the four switching inputs. The durations of these pulses are in the ratios of 8:4:2:1. Thus according to the contents of the connected shift register each LED is energized for a time which lies between the 0 and 15 time units, in such a way that the energy delivered per image line is the same for all the LED's. In order to control the light output of all the LED's simultaneously, the voltage across the array of LED's can be varied.

A disadvantage of the known method and device is that in the case of a moving photo-conductor the image points formed will not be on one line, because the energization times differ. Since in principle all the LED's are energized simultaneously, a very high switching current will flow through a long array of LED's, thus seriously interfering with other control electronics. Also, when grey tints are to be produced, obtained by generating small and large image points by means of the time control system described, the center of the small image points will be offset from the center of the large image points. The result is an unnatural imaging, which gives a disturbing effect particularly in the case of larger optical density transitions.

Another disadvantage of the known device is that when the light yield of all the LED's has to be changed by changing the voltage across those LED's, other correction values have to be applied, since the light yield as a function of the voltage applied differs for each individual LED.

It is, therefore, an object of the invention to provide a method and an exposure device which overcomes the disadvantages of the various prior art methods. It is a further object of the invention to provide a means of forming image points using LED arrays on a photoconductor.

SUMMARY OF THE INVENTION

In general, the present invention provides a method in which each individual LED of the array can be energized symmetrically about an imaginary line extending parallel to the array for a variable time for each image line.

The exposure device of the present invention comprises a plurality of comparator circuits each having at least a first and second imput and an output. Preferably, each comparator circuit is an n-bit digital comparator circuit which contains an n-bit corrected image signal. A signal generator is provided to provide to the first input of the comparator circuits a signal which decreases uniformly during a selected time interval and thereafter increases uniformly to the initial value during a same selected time interval. Preferably, the signal generated is a series of n-bit binary numbers which decreases and increases at the same frequency.

The array of LED's is preferably positioned perpendicular to the direction of travel of the photosensitive layer. Each LED in the array is connected to an associated output of a comparator circuit. A plurality of buffers is provided such that each buffer is connected to the associated second input of each LED stores data representative of the corrected image signal for that LED. Preferably, the corrected signal is an n-bit corrected image signal.

The result of the present invention is that the image points are always imaged symmetrically about an imaginary line, parallel to the array of LED's. Since not all the LED's are energized simultaneously, the switchingon current decreases. Other advantages of the present invention will become apparent from a Perusal of the following detailed description of a presently preferred embodiment taken in connection with the accompanying drawings.

PRESENTLY PREFERRED EMBODIMENT

Figure 1:
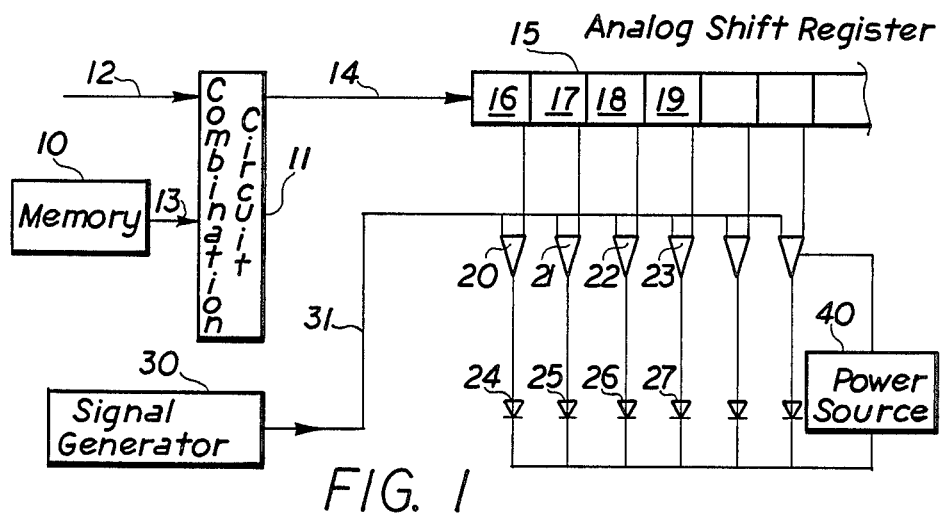
FIG. 1 is a diagrammatical representation of a control circuit for use in an exposure device according to the invention.

Referring to FIG. 1, the individual LED's 24–27 indicate only a small part of a straight array of LED's. A straight array of LED's of this kind is generally constructed from a large number of individual LED's having a density of about ten LED's per mm. If such an array of LED's is used as an exposure source for an electrophotographic printer, it must contain about 3000 LED's. The array is typically positioned a small distance from the photoconductive layer with an array of imaging glass fibers disposed between the array and the photo-conductive layer to rpovide an image of each LED on the photoconductor.

A 4-bit correction number is stored in memory 10 for each LED 24-27 and is in inverse proportion to the relative energy delivery of the LED's. The outputs of memory 10 are connected via bus 13 to a combination circuit 11. Combination circuit 11 preferably comprises an A/D converter in which the 4-bit correction number is converted into a corresponding d.c. voltage. An inverted image signal is also fed to combination circuit 11 via line 12 and this inverted image signal is multiplied by said d.c. voltage. If the inverted image signal is a logic 1, the d.c. voltage signal is fed to a buffer 15, preferably an analog serial-in-parallel-out shift register, via line 14. However, if the inverted image signal is a logic 0, then no signal is fed on line 14.

Memory 10 is addressed by a counter, the contents of which are increased synchronously by the image signal supplied. The analog shift register 15 is thus filled with the data concerning an entire image line. The parallel outputs 16-19 et seq. of the shift register are each connected to an associated input of a comparator circuit 20-23 et seq. Thus, output 16 of shift register 15 is connected to the associated input of comparator circuit 20, output 17 of shift register 15 is connected to the associated input of comparator circuit 21, and so on.

The outputs of the comparator circuits 20-23 et seq. are each connected to an associated LED 24-27 et seq. For each image line to be imaged, signal generator 30 delivers a pulse the shape of which will be described hereinafter with respect to FIG. 2. If the value of the output signal 16 of shift register 5 is higher than the instantaneous value of the pulse of the signal generator 30, the output of the comparator circuit 20 will become "high", and LED 24 will be energized. When the instantaneous value of the pulse of signal generator becomes higher than the value of the output signal 16 of shift register 15, the output of the comparator circuit 20 will become "low", and LED 24 will go out.

Similarly, the other LED's 25-27 will be energized for a given time per image line. To obtain the required intensity, an adjustable supply source 40 is connected across the LED's and adjusts the voltage between the outputs of comparator circuits 20-23 and the common electrode of the array of LED's 24-27.

Figure 2:
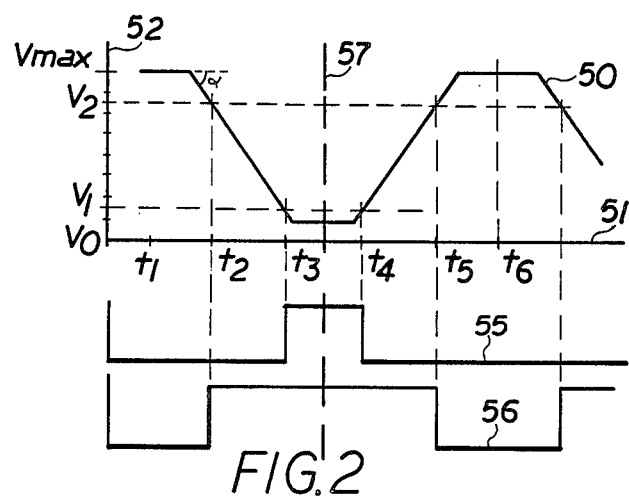
FIG. 2 illustrates various waveforms obtained in the control circuit shown in FIG. 1.

FIG. 2 represents the various waveforms obtained in the circuit according to FIG. 1. On the time line 51 reference t1 denotes the time at which an image line is fed to the shift register 15 while t6 denotes the time at which a following image line is fed to shift register 15. Signal generator 30 generates a signal 50, the shape of which corresponds to an (inverted) isosceles trapezium. The axis of symmetry 57 is situated between the times t1 and t6. The voltage which may be available at the outputs of shift register 15 is plotted laong the vertical axis 52, where Vo denotes the minimum voltage and Vmax denotes the maximum voltage which may be present. Waveform 55 indicates the value of the output of comparator circuit 20 and waveform 56 indicates the value of the output of comparator circuit 21. If the d.c. voltage of output 16 of shift register 15 corresponds to V1 (on axis 52), this voltage will at time t3 be higher than the instantaneous value of signal 50, so that the output of comparator circuit 20 becomes "high". The instantaneous value of signal 50 agains becomes higher than V1 at times t4, so that the output of comparator circuit 20 again becomes "low".

LED 24 will be energized during the time interval t3 to t4. Similarly, the d.c. voltage of output 17 of shift register 15, corresponding to V2 (on axis 52), will at time t2 be higher than the instantaneous value of signal 50, so that the output of comparator circuit 21 becomes "high". At time t5 the instantaneous value of signal 50 becomes again higher than V2 so that the output of comparator circuit 21 again becomes "low". LED 25 will be energized during the time t2 to t5.

The result is that all the LED's are energized symmetrically around axis 57 so that the image places of an image line are imaged on the photoconductor symmetrically about an imaginary line which is situated parallel to the array of LED's.

The angle α in FIG. 2 depends on the magnitude of the required light energy variations. If the differences in light outputs of the individual LED's are considerable, angle α must be small, and the same applies for the rendering of grey tints by means of image point size variations. For the straight arrays of LED's available at the present time, the angle α may be less than approximately 70°.

Figure 3:
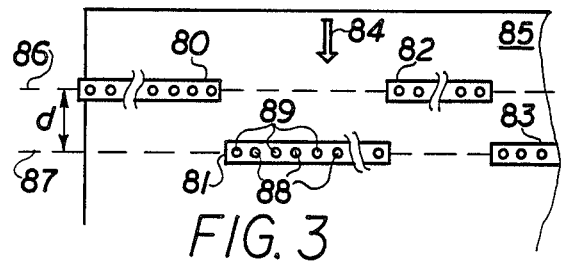
FIG. 3 represents a LED-array.

FIG. 3 represents a LED array constructed from two arrays of LED's 86 and 87, of which even array 86 comprises block 80 and 82 and of which odd array 87 comprises block 81 and 83. Each block comprises 128 LED's which are subdivided per block into even LED's 88 and odd LED's 89. The distance between the two arrays 86 and 87 is denoted by d.

A light-sensitive layer 85 is moved in the direction of array 84 past the LED-array.

Figure 4:
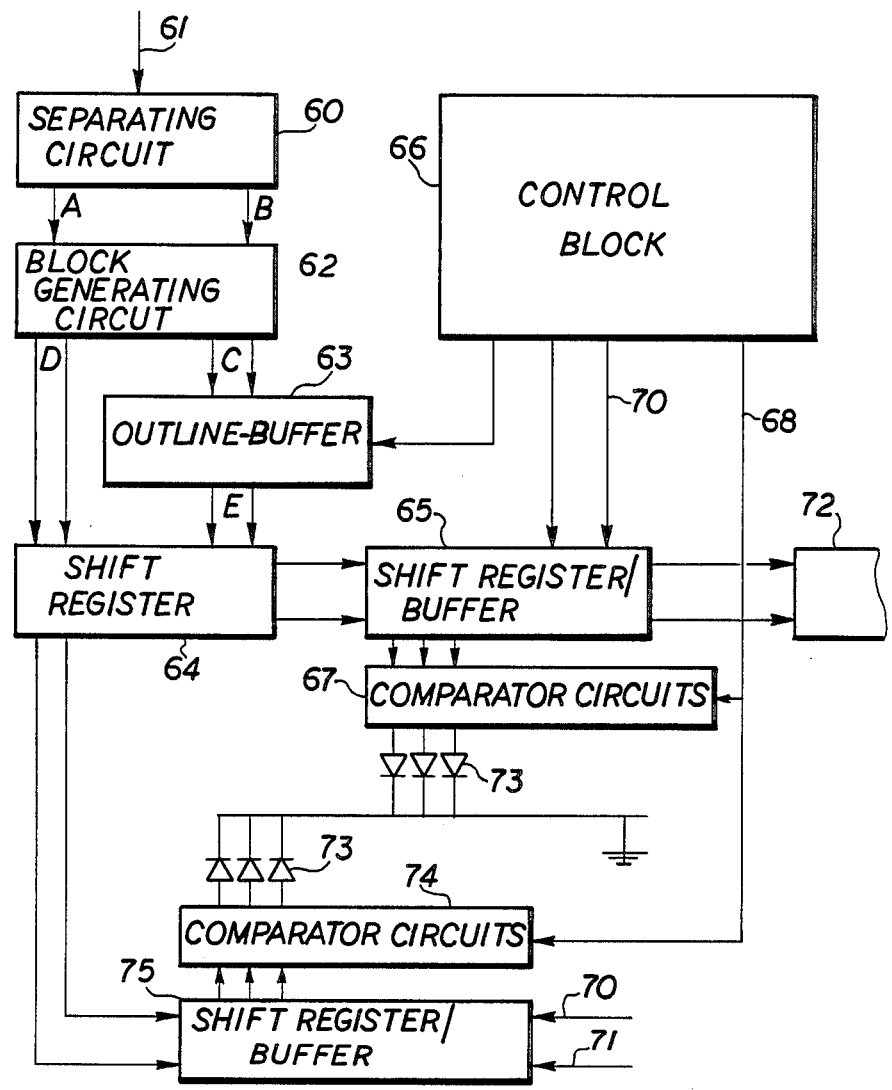
FIG. 4 is a schematical representation of a digital control circuit in an exposure device according to the invention.

FIG. 4 is a schematical representation of a digital control circuit in an exposure device according to the invention for controlling a LED array of the kind represented in FIG. 3. In the following description of the embodiment shown in FIG. 4, reference will be made to the LED array described pursuant to FIG. 3. Digital image data concerning an image line are fed at a frequency of, for example, 16 MHz, via line 61, to circuit 60 which separates the even and odd image points and feeds these separated data over lines A and B respectively to circuit 62 at a frequency of 8 MHz. Circuit 62 arranges these data in even blocks D, for LED blocks 80 and 82, and odd blocks C, for LED blocks 81 and 83. The data for the odd LED blocks 81 and 83 are so delayed via an outline-buffer 63 as to be fed to LED blocks 81 and 83 after a time corresponding to the time required to move the light-sensitive layer 85 over a distance d. The even blocks are fed at a frequency of 4 MHz over lines D, separated into odd and even image points, to a uniformity compensation circuit 64, while the delayed odd blocks are fed over lines E, again separated into odd and even image points, to uniformity compensation circuit 64. Circuit 64 comprises a memory containing data on the relative energy output for each LED. For each LED this is a 4-bit word which is in inverse proportion to the relative energy output of that LED. These 4-bit words are fed in the correct sequence, and in dependence on the image data, to alternately a double 64×4-bit shift register/buffer 65 and to a double 64×4-bit shift register/buffer 75. The double 64 parallel 4-bit outputs of shift register 65 are connected to inputs of the double 64×4-bit comparator circuits 67. Similarly, the double 64 parallel 4-bit outputs of shift register 75 are connected to the inputs of the double 64×4-bit comparator circuits 74. Each output from a 4-bit comparator circuit is connected by a driver to a LED of the LED array, denoted by reference 73 in the drawing. Thus, LED block 81 is connected to comparator circuits 67 and LED block 80 to comparator circuits 74.

Thus, for each LED block the circuit comprises two 64×4-bit shift registers, two 64×4-bit buffers, two 64×4 comparator circuits and two groups of 64 drivers connected to 64 even and 64 odd LED's in one LED block. The control block 66 delivers a clock signal 70 and other control signals, not indicated, which ensure a correct timing. When all the shift registers 75, 65, 72 etc. are loaded with 4-bit words at outputs corresponding to the image dta of an image line (image datum=0 means a 4-bit word of 0000 at the associated output in a shift register), these words are passed to the corresponding buffers by means of a control signal originating from control block 66. A new image line can then again be fed to the shift registers.

A 4-bit time-base word is fed over a bus 68 to all the comparator circuits. The comparator circuits are of the conventional type by means of which two 4-bit words can be compared with one another, i.e., in this case the time-base word and a 4-bit word originating from one of the shift registers (compensation word). If the time-base word is smaller than the compensation word, the output signal of the circuit is "high" and the associated LED is on. If the time-base word is larger than or equal to the compensation word, then the output signal of the comparator circuit is "low" and the associated LED is off. The time base for the operation of the circuit according to the invention is formed as described below.

At the time when the 4-bit compensation words are passed to the buffers, and hence applied to the 4-bit inputs of the comparator circuits, the binary time-base word 1111, corresponding to the decimal number 15, is fed via bus 68 to the other inputs of the comparator circuits for a given time. The binary time-base word 1110 corresponding to decimal 14 is then fed to bus 68 for a given time. Thus, the cycle is carried out to the decimal number 0, corresponding to binary 0000. This binary timebase word 0000 is maintained for a somewhat longer time, after which the cycle takes place in the reverse sequence. The binary time-base words 0001, 0010, 0011, 0100, etc. to 1111 become available successively over bus 68.

If a 4-bit compensation word is now greater than the instantaneous decreasing time-base word, then the output of the comparator circuit becomes "high" and the LED goes on. This condition is maintained until the time-base word in the ascending cycle becomes again greater than or equal to the associated compensation word. At that time the output of the comparator circuit again becomes "low" and the LED goes out. By now carrying out the decreasing cycle for the time-base word at the same speed as the increasing cycle, the result is that all the LED's are energized symmetrically with respect to a fixed line.

A binary 4-bit up-and-down counter with presetting is used to generate the series of time-base words. This counter is so preset for each image line that the value 1111 is obtained on the four outputs connected to bus 68. The control block 66 comprises an oscillator which delivers a series of clock pulses at a high frequency. These clock pulses are fed to the input of the counter via an adjustable divider. If the divider is set, for example, to 200, then a pulse which sets the counter back one step, i.e., to 1110, will be delivered at the output of the divider after 200 clock pulses. The counter will again be set back one step after another 200 clock pulses. The output then delivers 1101. This continues until 0000 appears at the output of the counter after a total of 15 set-back steps. The counter is then stopped and a second presettable counter controlled by the same divided clock pulses is started. After reaching the preset value, which in the example given is reached after a multiple of 200 clock pulses, the up-and-down counter is switched over to "counting up" and restarted. After each 200 clock pulses the binary output of the counter is increased by 0001 and this continues until the counter state has risen to 1111 after 15 steps. The counter is then stopped and remains in that condition until the next image line. A reset pulse then brings the two counters back into a start position for the new image line.

The time required to expose the light-sensitive layer exactly with the LED's delivering the highest light output is adjusted by means of the second counter. The adjustment of the divider, the divident, determines the slope of the ascending and descending part of the time-base signal.

With the circuit described it is very simple to change the exposure time, for example, if the light-sensitivity of the light-sensitive layer declines. To this end, the divident is increased so that the decending and ascending slope, and also the flat portion therebetween, is lengthened in time. The exposure times of the individual LED's are thus increased proportionally so that it is always possible to use the same correction numbers. The place of the symmetry line 57 (FIG. 2) and hence the centers of the image points, are shifted on the light-sensitive layer, but the shift is the same for all the image lines.

While a presently preferred embodiment of the invention has been described and shown in particularity, the invention may be otherwise embodied within the scope of the appended claims.

What is claimed is:

1. In a method of exposing a movable light-sensitive layer by means of a straight array of LED's in which each image line is imaged onto the light-sensitive layer wherein each individual LED in said array is energized for a variable time for each image line, the improvement therein comprising energizing for a variable time each individual LED in said array symmetrically with respect to an imaginary line extending parallel to said array for each image line.

2. In an exposure device for exposing a movable light-sensitive layer comprising a straight array of individual LED's for line-wise exposure of said light-sensitive layer, said array extending perpendicularly to the direction of movement of said light-sensitive layer; and means for energizing for a variable time each individual LED in said array for each image line, wherein said time variation corresponds to corrected image signals, the improvement comprising a circuit means for energizing each individual LED is said array symmetrically with respect to an imaginary line extending parallel to said array for each image line.

3. The exposure device set forth in claim 2, wherein said circuit means comprises (i) a plurality of comparator circuits each having at least first and second inputs and an output;

(ii) a signal generator, electrically connected to the first inputs of each comparator circuit, said generator providing a signal which decreases uniformly during a selected time interval and therefter increases uniformly to the initial value during a same selected time interval;

(iii) a plurality of LED's, each of said LED's being electrically connected to the output of an associated comparator circuit, and (iv) a plurality of buffers, each of said buffers being connected to an associated second input of said comparator circuits for storing data representative of the corrected image signal.

4. An exposure device according to claim 3, wherein said comparator circuits comprise n-bit digital comparator circuits and each of said buffers connected thereto contains an n-bit corrected image signal and wherein said generator provides a signal in the form of a series of binary numbers.

5. An exposure device according to claim 4, wherein said generator generates for each image line a uniformly decreasing series of n-bit binary numbers and then a series of n-bit binary numbers which increases again at the same frequency.

6. An exposure device according to claim 3, 4 or 5, wherein said generator maintains the reduced signal for some time during the uniform decrease and uniform increase of the delivered signal.

7. An exposure device according to claim 6, including an adjustable divider and oscillator wherein the rate of decrease and increase and the duration of the maintained signal, are adjusted by means of said adjustable divider, the input of which is provided with clock pulses originates from said oscillator set to a fixed frequency.

* * * * *

UNITED STATES PATENT AND TRADEMARK OFFICE
CERTIFICATE OF CORRECTION

PATENT NO. : 4,712,116

DATED : December 8, 1987

INVENTOR(S) : HANS REINTEN

It is certified that error appears in the above-identified patent and that said Letters Patent is hereby corrected as shown below: Title page:

column 1, line 3 of section [54] delete "LED'S" and substitute therefor -- LEDS --;
Column 1, line 2, after "ARRAY" delete "LED'S" and substitute therefor -- LEDS --;
Column 2, lines 45 and 46, after "the" delete "switchin-gon" and substitute therefor -- switching-on --;
Column 3, line 7, after "to" delete "rpovide" and substitute therefor -- provide --;
Column 3, line 38, after "register" delete "5" and substitute therefor -- 15 --;
Column 3, line 61, after "plotted" delete "laong" and substitute therefor -- along --;
Column 4, line 3, after "50" delete "agains" and substitute therefor -- again --;
Column 4, line 4, after "at" delete "times" and substitute therefor -- time --;
Column 5, line 17, after "image" delete "dta" and substitute therefor -- data --.

Signed and Sealed this

Twelfth Day of July, 1988

*Attest:*

DONALD J. QUIGG

*Attesting Officer*    Commissioner of Patents and Trademarks